US009115677B2

(12) United States Patent
Stockbridge et al.

(10) Patent No.: US 9,115,677 B2
(45) Date of Patent: Aug. 25, 2015

(54) PROPORTIONAL FLOW VENTURI VACUUM SYSTEM FOR AN INTERNAL COMBUSTION ENGINE

(71) Applicants: GM GLOBAL TECNOLOGY OPERATIONS LLC, Detroit, MI (US); NYLONCRAFT INCORPORATED, Mishawaka, IN (US)

(72) Inventors: John Norman Stockbridge, Waterford, MI (US); Matthew W. Burnham, Allen Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 14/065,787

(22) Filed: Oct. 29, 2013

(65) Prior Publication Data
US 2015/0114321 A1    Apr. 30, 2015

(51) Int. Cl.
| F02B 63/00 | (2006.01) |
| F02M 35/10 | (2006.01) |
| B60T 13/46 | (2006.01) |
| F02D 41/00 | (2006.01) |
| F02M 3/09 | (2006.01) |
| F02M 25/07 | (2006.01) |
| F02D 9/08 | (2006.01) |

(52) U.S. Cl.
CPC .......... *F02M 35/10229* (2013.01); *B60T 13/46* (2013.01); *F02D 9/08* (2013.01); *F02D 41/0002* (2013.01); *F02D 2250/41* (2013.01); *F02M 3/09* (2013.01); *F02M 25/0713* (2013.01); *Y02T 10/42* (2013.01)

(58) Field of Classification Search
CPC ..... B60T 13/46; Y02T 10/42; F02D 41/0002; F02D 9/08; F02D 2250/41; F02D 2009/024; F02M 35/10229; F02M 25/0713; F02M 3/09
USPC ...................... 123/336, 683, 520, 2
See application file for complete search history.

(56) References Cited

U.S. PATENT DOCUMENTS

| 3,977,375 | A | * | 8/1976 | Laprade et al. ............... 123/700 |
| 4,331,226 | A | * | 5/1982 | Heidemeyer et al. ......... 477/175 |
| 5,642,698 | A | * | 7/1997 | Diehl et al. ............. 123/184.42 |
| 2007/0199550 | A1 | * | 8/2007 | Lindmark et al. ............ 123/572 |
| 2012/0024261 | A1 | * | 2/2012 | Ulrey et al. ................... 123/336 |
| 2014/0123941 | A1 | * | 5/2014 | Ulrey et al. ................... 123/350 |
| 2014/0165931 | A1 | * | 6/2014 | Pursifull .......................... 123/2 |
| 2014/0196699 | A1 | * | 7/2014 | Ulrey et al. ............. 123/568.12 |
| 2015/0047605 | A1 | * | 2/2015 | Buckland et al. ............. 123/403 |

* cited by examiner

*Primary Examiner* — Marguerite McMahon
*Assistant Examiner* — James Kim
(74) *Attorney, Agent, or Firm* — Quinn Law Group, PLLC

(57) ABSTRACT

A vacuum assist system attaches to an intake line and an intake manifold of an internal combustion engine having a throttle. The vacuum assist system includes a venturi valve, a reservoir, and a proportionally controlled valve. The proportionally controlled valve is movable between an open position and a closed position. The proportionally controlled valve moved to the open position when the throttle is in the partially open position such that air is flows from the inlet to the intake manifold, from the inlet to the venturi valve, from the venturi valve to the intake manifold, and from the reservoir to the venturi valve. The proportionally controlled valve moves to the closed position when the throttle is in the almost-closed position such that air flows from the inlet to the intake manifold via the intake line and from the reservoir to the intake manifold to reduce the pressure within the reservoir.

18 Claims, 2 Drawing Sheets

PROPORTIONAL FLOW VENTURI VACUUM SYSTEM FOR AN INTERNAL COMBUSTION ENGINE

TECHNICAL FIELD

The present disclosure relates to a proportional flow venturi vacuum system for an internal combustion engine.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston-type internal combustion engine (ICE). The internal combustion engine converts chemical energy stored in fuel (gasoline, diesel, bio fuels, natural gas, or other fuels) into kinetic energy through combustion of the fuel mixed with air.

Similar to positive pressure, a negative pressure or vacuum may be used to assist in the performance of a variety of functions. To generate a vacuum, a device is typically employed to remove at least some portion of a gas present in a sealed volume.

In motor vehicles, vacuum is often used to generate a load assist for actuation of various on-board systems, such as vehicle brakes. When employed to assist in the actuation of motor vehicle brakes, a booster device or a vacuum servo is used to accumulate and store the vacuum. The stored vacuum is subsequently used to multiply the braking force applied by an operator at the brake pedal, thereby decreasing the effort the operator is required to exert during braking of the vehicle.

Depending on the type of engine or other power plant employed by a particular motor vehicle, either the engine's manifold vacuum or a separate vacuum pump may be used to provide a vacuum for accumulation by the booster device. If a vacuum pump is used in the motor vehicle, it is typically driven directly by the engine.

SUMMARY

In one aspect of the disclosure, a powertrain includes a combustion chamber, a throttle, an intake manifold, an intake line, a venturi valve, a reservoir, and a proportionally controlled valve. The combustion chamber is configured for combusting an air and fuel mixture. The throttle is movable between a partially opened position and an almost-closed position to selectively vary the flow of air therethrough. The intake manifold is operatively attached to the combustion chamber and is configured to receive air from the throttle and supply the air to the combustion chamber. A manifold vacuum is generated in the intake manifold in response to combusting the air and fuel mixture in the combustion chamber. The intake line extends between an inlet and the intake manifold. The throttle is operatively disposed along the intake line. The venturi valve is operatively connected between the intake line and the intake manifold. The reservoir is fluidly connected between the intake manifold and the venturi valve. The proportionally controlled valve is operatively connected between the intake manifold and the venturi valve. The proportionally controlled valve is movable between an open position and a closed position. The proportionally controlled valve is configured to move to the open position in response to the throttle being in the partially open position such that air flows from the inlet to the intake manifold via the intake line, from the inlet to the venturi valve, from the venturi valve to the intake manifold, and from the reservoir to the venturi valve to reduce the pressure within the reservoir. The proportionally controlled valve is configured to move to the closed position in response to the throttle being in the almost-closed position such that air flows from the inlet to the intake manifold via the intake line and from the reservoir to the intake manifold to reduce the pressure within the reservoir.

In another aspect of the disclosure, an intake assembly is configured for attachment to an internal combustion engine. The intake assembly includes a throttle, an intake manifold, an intake line, a venturi valve, a reservoir, and a proportionally controlled valve. The throttle is movable between a partially opened position and an almost-closed position to selectively vary the flow of air therethrough. The intake manifold is configured to be in fluid communication with the combustion chamber and is configured to receive air from the throttle and supply the air to the combustion chamber. A manifold vacuum is configured to be generated in the intake manifold in response to combusting the air and fuel mixture in the combustion chamber. The intake line extends between an inlet and the intake manifold. The throttle is operatively disposed along the intake line. The venturi valve is operatively disposed between the intake line and the intake manifold. The reservoir is fluidly connected between the intake manifold and the venturi valve. The proportionally controlled valve is operatively connected between the intake manifold and the venturi valve. The proportionally controlled valve is movable between an open position and a closed position. The proportionally controlled valve is configured to move to the open position in response to the throttle being in the partially open position such that air flows from the inlet to the intake manifold via the intake line, from the inlet to the venturi valve, from the venturi valve to the intake manifold, and from the reservoir to the venturi valve to reduce the pressure within the reservoir. The proportionally controlled valve is configured to move to the closed position in response to the throttle being in the almost-closed position such that air flows from the inlet to the intake manifold via the intake line and from the reservoir to the intake manifold to reduce the pressure within the reservoir.

In yet another aspect of the disclosure, a vacuum assist system is configured for attachment to an intake line and an intake manifold of an internal combustion engine having a throttle. The vacuum assist system includes a venturi valve, a reservoir, and a proportionally controlled valve. The venturi valve is configured to be operatively connected between the intake line and the intake manifold. The reservoir is configured to be fluidly connected between the intake manifold and the venturi valve. The proportionally controlled valve is configured to be operatively disposed between the intake manifold and the venturi valve. The proportionally controlled valve is movable between an open position and a closed position. The proportionally controlled valve is configured to move to the open position in response to the throttle being in the partially open position such that air is configured to flow from the inlet to the intake manifold via the intake line, from the inlet to the venturi valve, from the venturi valve to the intake manifold, and from the reservoir to the venturi valve to reduce the pressure within the reservoir. The proportionally controlled valve is configured to move to the closed position in response to the throttle being in the almost-closed position such that air is configured to flow from the inlet the intake manifold via the intake line and from the reservoir to the intake manifold to reduce the pressure within the reservoir.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
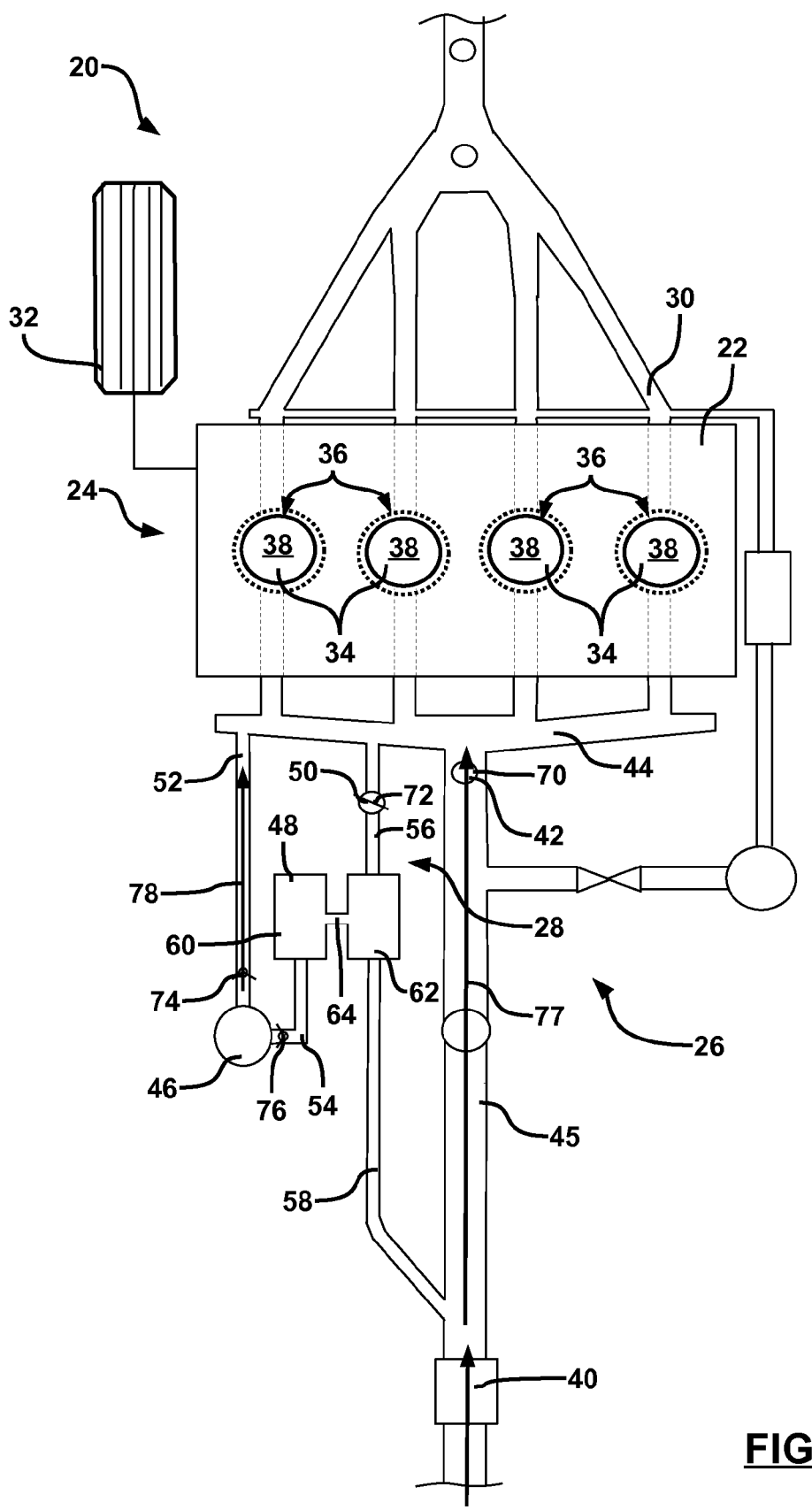
FIG. 1 is a schematic plan view of a vehicle including a powertrain having an internal combustion engine with a throttle in an almost-closed position and a proportionally controlled valve in a closed position.

Referring to the Figures, wherein like numerals indicate like parts throughout the several views, a vehicle 20 is generally shown at in FIG. 1. The vehicle 20 has a powertrain 24 that includes an intake assembly 26, a vacuum assist system 28, an internal combustion engine 22, and an exhaust manifold 30. The internal combustion engine 22 is configured to power and propel at least one wheel 32 of the vehicle 20. The internal combustion engine 22 may include but is not limited to a diesel engine 22 or a gasoline engine 22. The internal combustion engine 22 includes cylinders 34, each defining a combustion chamber 36. A piston 38 is operatively disposed in each combustion chamber 36. However, it should be appreciated that the internal combustion engine 22 may include any suitable size and/or configuration of engine 22, including but not limited to a four cylinder, an in-line six cylinder engine 22, a v-style six cylinder engine 22, or a v-style eight cylinder engine 22, and the like.

The combustion chamber 36 is configured for combusting an air/fuel mixture to provide drive torque to propel the wheels 32 of the vehicle 20. Air may enter the combustion chamber 36 of the internal combustion engine 22 by passing through an air filter 40 before entering the intake assembly 26. The intake assembly 26 includes a throttle 42 and an intake manifold 44. The throttle 42 is operatively disposed along an intake line 45. The intake line 45 extends between an inlet and the intake manifold 44. The air filter 40 may be disposed along the intake line 45, between the inlet and the throttle 42. The throttle 42 is configured to selectively vary the flow of air therethrough. Therefore, the intake assembly 26 supplies air into the combustion chamber 36. Fuel is injected into the combustion chamber 36 to mix with the air, which provides an air/fuel mixture. Spark plugs (not shown) ignite the air/fuel mixture within the combustion chamber 36. Combustion of the air/fuel mixture creates exhaust gas. The exhaust gas exits the combustion chamber 36 and is drawn into the exhaust manifold 30.

Manifold vacuum, or engine 22 vacuum, in the internal combustion engine 22 is created as a result of the piston's 38 movement on the induction stroke and the choked flow through the throttle 42 in the intake assembly 26, which is a measure of the amount of restriction of airflow through the engine 22, and hence of the unused power capacity in the engine 22. The manifold vacuum is the difference in air pressure between the manifold pressure inside the intake manifold 44 and atmospheric pressure. The manifold vacuum is also used as an auxiliary power source to drive engine accessories, as described in more detail below.

When the throttle 42 is partially opened, e.g., by depressing an accelerator pedal, ambient air fills the intake manifold 44, resulting in an increased pressure. A fuel injection system (not shown) adds fuel to the airflow, providing energy to the engine 22. When the throttle 42 is opened all the way, the engine's 22 intake assembly 26 is exposed to full atmospheric pressure, and maximum airflow through the engine 22 may be achieved. It should be appreciated that superchargers and turbochargers (not shown) can also be used to "boost" the manifold pressure to above atmospheric pressure.

During the induction stroke, the piston 38 descends in the cylinder 34 and the throttle 42 is open. As the piston 38 descends, the piston 38 effectively increases the volume in the cylinder 34 above it, setting up low pressure. Atmospheric pressure pushes air through the manifold and carburetor or fuel injection system, where the air is mixed with fuel. Because multiple cylinders 34 operate at different times in the engine cycle, there is almost a constant pressure difference through the intake manifold 44 from the fuel injection system to the engine 22.

If the engine 22 is operating under light load, or no load, and low or closed throttle 42, there is high manifold vacuum. As the throttle 42 is opened, the engine 22 speed increases rapidly. The engine 22 speed is limited only by the amount of fuel/air mixture that is available in the manifold.

Likewise, if the engine 22 is operating under heavy load at a wide open throttle 42, such as accelerating from a stop or pulling the vehicle 20 up a hill, then engine 22 speed is limited by the load and minimal manifold vacuum will be created. In this scenario, since the pistons 38 are descending more slowly than when the engine 22 is under no load, the pressure differences are low. The engine 22 may draw air into the cylinders 34 at or near ambient pressure. As a result, a manifold vacuum may be created.

The vacuum assist system 28 includes a pressure reservoir 46, a venturi valve 48, and a proportionally controlled valve 50. A first line 52 fluidly connects the intake manifold 44 and the pressure reservoir 46; a second line 54 fluidly connects the pressure reservoir 46 and the venturi valve 48; a third line 56 fluidly connects the venturi valve 48 and the intake manifold 44. The proportionally controlled valve 50 is operatively disposed along the third line 56. A bypass line 58 fluidly connects the intake line 45 and the venturi valve 48. The pressure reservoir 46 is configured to provide a reservoir vacuum to accessories in the vehicle 20, such as brake operation, and the like.

The venturi valve 48 includes a first region 60 and a second region 62 with a neck 64 fluidly connecting the first region 60 and the second region 62. The cross-sectional area of the neck 64 is smaller than the first region 60 and the second region 62 to create a pressure change by accelerating the air flow therethrough. The second line 54 fluidly connects the pressure reservoir 46 and the first region 60. The third line 56 fluidly connects the second region 62 and the proportionally controlled valve 50. The bypass line 58 fluidly connects the intake line 45 and the second region 62.

Figure 2:
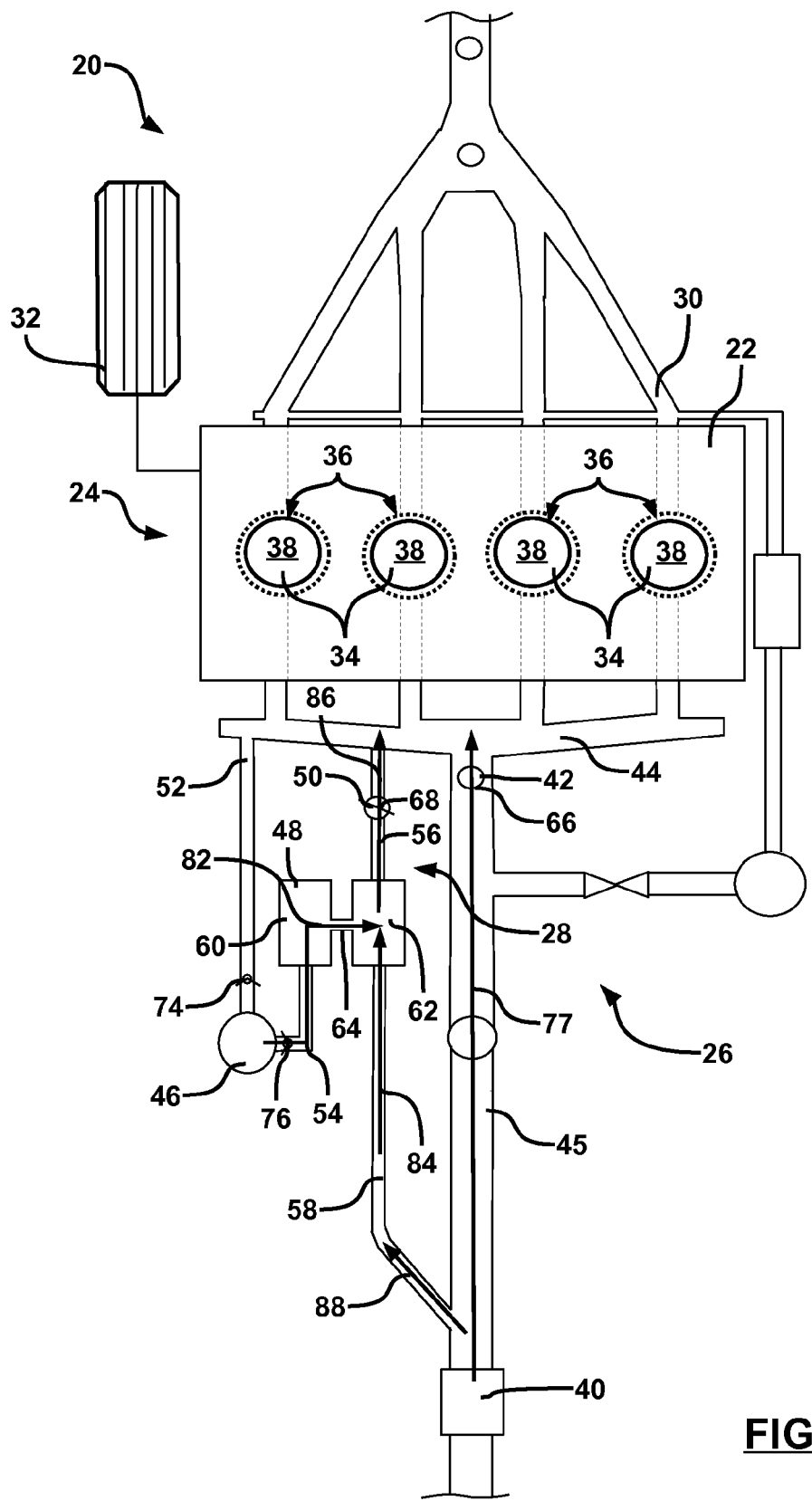
FIG. 2 is a schematic plan view of the vehicle if FIG. 1 with the throttle in a partially open position and the proportionally controlled valve in an open position.

Referring to FIG. 2, when the engine 22 is operating at partially open 66 throttle 42, the proportionally controlled valve 50 is in the open position 68, by virtue of the manifold vacuum. As such, the manifold vacuum draws the air into the inlet to enter the intake line 45 and the bypass line 58. The air flows through the intake line 45, past the throttle 42 and enters the intake manifold 44, as indicated by arrow 77. The air also respectively flows through the bypass line 58, as indicated by arrow 88; the second region 62 of the venturi valve 48, as indicated by arrow 84; and the third line 56, where the air enters the intake manifold 44, as indicated by arrow 86. As the air flows from the bypass line 58 to the third line 56 through the second region 62, a venturi vacuum is created within the venturi valve 48, due to the venturi effect. As such, air is pulled from the first region 60, through the neck 64, into the second region 62, as indicated by arrow 82, to mix with the air passing through the second region 62 from the inlet 40, as indicated by arrow 84. Further, the venturi vacuum draws the air into the first region 60 from the second line 54 and the reservoir 46.

With continued reference to FIG. 2, the first region 60 of the venturi valve 48 is configured such that air enters from the second line 54 at a low pressure and the second region 62 is configured such that air enters from the first region 60 at a high pressure. More specifically, the neck 64 that fluidly connects the first region 60 and the second region 62 causes the pressure of the air to increase as the air flows from the first region 60 to the second region 62. As such, the high pressure in the second region 62 is greater than the low pressure in the first region 60.

Referring now to FIG. 1, as the throttle 42 is moved to an almost closed position 70 or idle position, the proportionally controlled valve 50 moves to a closed position 72. As the proportionally controlled valve 50 moves to the closed position 72, air is prevented from passing therethrough. As such, air only enters the intake manifold 44 from the inlet via the intake line 45. This limits the flow of air around the throttle 42 above idle to support off idle vehicle 20 vacuum requirements. Idle vacuum levels may be supported in the historical manner from the manifold vacuum.

Referring again to FIG. 1, when the throttle 42 is almost closed, the manifold vacuum pulls air from the reservoir 46, via the first line 52, as indicated by arrow 78. This creates a reserve vacuum within the reservoir 46. A first check valve 74 is operatively disposed along the first line 52. The first check valve 74 is configured to allow the unidirectional flow of air along the first line 52, from the reservoir 46 to the intake manifold 44. The first check valve 74 opens and closes based on a pressure differential between the reservoir 46 and the intake manifold 44. When the throttle 42 is in the almost closed position 70, the proportionally controlled valve 50 moves to the closed position 72 and the venturi valve 48 does not function. This configuration results in the first check valve 74 opening such that air flows from the reservoir 46 to the intake manifold 44, thus reducing the amount of air flowing around the throttle 42 and into the engine 22 at idle, as indicated by arrow 78.

Referring to FIG. 2, when the throttle 42 is in the partially open 66 position, the manifold vacuum pulls air from the reservoir 46, via the venturi valve 48, as indicated by arrow 82. A second check valve 76 is operatively disposed along the second line 54. The second check valve 76 is configured to allow the unidirectional flow of air through the second line 54, from the reservoir 46 to the venturi valve 48. The second check valve 76 opens and closes based on a pressure differential between the reservoir 46 and the intake manifold 44, via the venturi valve 48. Therefore, when the throttle 42 is partially open 66, the proportionally controlled valve 50 moves to the open position 68 and the venturi vacuum is created. The pressure differential between the reservoir 46 and the intake manifold 44 is sufficient to open the second check valve 76 to allow air to flow from the reservoir 46 into the venturi valve 48.

The proportionally controlled valve 50, the first check valve 74, and the second check valve 76 may each be spring loaded valves that act as an automatic transition between the throttle 42 being almost-closed (FIG. 1) and the throttle 42 being partially closed (FIG. 2). Since the transition is not driven by a sensor and/or a switch, switching may be provided at low cost, while also avoiding the need to detect the function of both the sensor and/or the switch.

While the best modes for carrying out the disclosure have been described in detail, those familiar with the art to which this disclosure relates will recognize various alternative designs and embodiments for practicing the disclosure within the scope of the appended claims.

The invention claimed is:

1. A powertrain comprising: a combustion chamber configured for combusting an air and fuel mixture;
    a throttle movable between a partially opened position and an almost-closed position to selectively vary the flow of air therethrough;
    an intake manifold operatively attached to the combustion chamber and configured to receive air from the throttle and supply the air to the combustion chamber;
    wherein a manifold vacuum is generated in the intake manifold in response to combustion of the air and fuel mixture in the combustion chamber;
    an intake line extending between an inlet and the intake manifold, wherein the throttle is operatively disposed along the intake line;
    a venturi valve operatively connected between the intake line and the intake manifold;
    a pressure reservoir fluidly connected between the intake manifold and the venturi valve; and
    a proportionally controlled valve operatively connected between the intake manifold and the venturi valve;
    wherein the proportionally controlled valve is movable between an open position and a closed position;
    wherein the proportionally controlled valve is configured to move to the open position in response to the throttle being in the partially open position such that air flows from the inlet to the intake manifold via the intake line, from the inlet to the venturi valve, from the venturi valve to the intake manifold, and from the pressure reservoir to the venturi valve to reduce the pressure within the reservoir; and
    wherein the proportionally controlled valve is configured to move to the closed position in response to the throttle being in the almost-closed position such that air flows from the inlet to the intake manifold via the intake line and from the pressure reservoir to the intake manifold to reduce the pressure within the reservoir.

2. A powertrain, as set forth in claim 1, further comprising: a first check valve operatively disposed between the pressure reservoir and the intake manifold;
    wherein the first check valve is configured to allow only the unidirectional flow of air from the pressure reservoir to the intake manifold; and
    a second check valve operatively disposed between the pressure reservoir and the venturi valve;
    wherein the second check valve is configured to allow only the unidirectional flow of air from the pressure reservoir to the venturi valve.

3. A powertrain, as set forth in claim 2, wherein the first check valve is configured to open and permit the flow of air from the pressure reservoir to the intake manifold when the pressure differential between the pressure reservoir and the intake manifold is sufficiently high.

4. A powertrain, as set forth in claim 3, wherein the second check valve is configured to open and permit the flow of air from the pressure reservoir to the intake manifold when the pressure differential between the pressure reservoir and the venturi valve is sufficiently high.

5. A powertrain, as set forth in claim 4, wherein the first check valve opens and the second check valve remains closed when the throttle is in the almost-closed position and the proportionally controlled valve is in the closed position such that air flows from the pressure reservoir to the intake manifold through the first check valve and air is prevented from flowing from the pressure reservoir to the venturi valve through the second check valve; and wherein the first check valve closes and the second check valve opens when the throttle is in the partially open position and the proportionally controlled valve is in the open position such that air flows from the pressure reservoir to the venturi valve through the second check valve and air is prevented from flowing from the pressure reservoir to the intake manifold through the first check valve.

6. A powertrain, as set forth in claim 4, further comprising:
a first line fluidly connecting the intake manifold and the pressure reservoir;
wherein the first check valve is operatively disposed along the first line;
a second line fluidly connecting the pressure reservoir and the venturi valve;
wherein the second check valve is operatively disposed along the second line;
a third line fluidly connecting the venturi valve and the intake manifold;
wherein the proportionally controlled valve is operatively disposed along the third line; and
a bypass line fluidly connecting the intake line and the venturi valve.

7. An intake assembly configured for attachment to an internal combustion engine, the intake assembly comprising:
a throttle movable between a partially opened position and an almost-closed position to selectively vary the flow of air therethrough;
an intake manifold configured to be in fluid communication with the combustion chamber and configured to receive air from the throttle and supply the air to the combustion chamber;
wherein a manifold vacuum is configured to be generated in the intake manifold in response to combustion of the air and fuel mixture in the combustion chamber;
an intake line extending between an inlet and the intake manifold, wherein the throttle is operatively disposed along the intake line;
a venturi valve operatively disposed between the intake line and the intake manifold;
a pressure reservoir fluidly connected between the intake manifold and the venturi valve; and
a proportionally controlled valve operatively connected between the intake manifold and the venturi valve;
wherein the proportionally controlled valve is movable between an open position and a closed position;
wherein the proportionally controlled valve is configured to move to the open position in response to the throttle being in the partially open position such that air flows from the inlet to the intake manifold via the intake line, from the inlet to the venturi valve, from the venturi valve to the intake manifold, and from the reservoir to the venturi valve to reduce the pressure within the pressure reservoir; and
wherein the proportionally controlled valve is configured to move to the closed position in response to the throttle being in the almost-closed position such that air flows from the inlet to the intake manifold via the intake line and from the pressure reservoir to the intake manifold to reduce the pressure within the pressure reservoir.

8. An intake assembly, as set forth in claim 7, further comprising:

a first check valve operatively disposed between the pressure reservoir and the intake manifold;
wherein the first check valve is configured to allow only the unidirectional flow of air from the pressure reservoir to the intake manifold; and
a second check valve operatively disposed between the pressure reservoir and the venturi valve;
wherein the second check valve is configured to allow only the unidirectional flow of air from the pressure reservoir to the venturi valve.

9. An intake assembly, as set forth in claim 8, wherein the first check valve is configured to open and permit the flow of air from the pressure reservoir to the intake manifold when the pressure differential between the pressure reservoir and the intake manifold is sufficiently high.

10. An intake assembly, as set forth in claim 9, wherein the second check valve is configured to open and permit the flow of air from the pressure reservoir to the intake manifold when the pressure differential between the pressure reservoir and the venturi valve is sufficiently high.

11. An intake assembly, as set forth in claim 10, wherein the first check valve opens and the second check valve remains closed when the throttle is in the almost-closed position and the proportionally controlled valve is in the closed position such that air flows from the pressure reservoir to the intake manifold through the first check valve and air is prevented from flowing from the pressure reservoir to the venturi valve through the second check valve; and wherein the first check valve closes and the second check valve opens when the throttle is in the partially open position and the proportionally controlled valve is in the open position such that air flows from the pressure reservoir to the venturi valve through the second check valve and air is prevented from flowing from the pressure reservoir to the intake manifold through the first check valve.

12. A vacuum assist system, as set forth in claim 1, further comprising:
a first line fluidly connecting the intake manifold and the pressure reservoir;
wherein the first check valve is operatively disposed along the first line;
a second line fluidly connecting the pressure reservoir and the venturi valve;
wherein the second check valve is operatively disposed along the second line;
a third line fluidly connecting the venturi valve and the intake manifold;
wherein the proportionally controlled valve is operatively disposed along the third line; and
a bypass line fluidly connecting the intake line and the venturi valve.

13. A vacuum assist system configured for attachment to an intake line and an intake manifold of an internal combustion engine having a throttle, the vacuum assist system comprising:
a venturi valve configured to be operatively connected between the intake line and the intake manifold;
a pressure reservoir configured to be fluidly connected between the intake manifold and the venturi valve; and
a proportionally controlled valve configured to be operatively disposed between the intake manifold and the venturi valve;
wherein the proportionally controlled valve is movable between an open position and a closed position;
wherein the proportionally controlled valve is configured to move to the open position in response to the throttle being in the partially open position such that air is configured to flow from the inlet to the intake manifold via the intake line, from the inlet to the venturi valve, from the venturi valve to the intake manifold, and from the pressure reservoir to the venturi valve to reduce the pressure within the pressure reservoir; and wherein the proportionally controlled valve is configured to move to the closed position in response to the throttle being in the almost-closed position such that air is configured to flow from the inlet to the intake manifold via the intake line and from the pressure reservoir to the intake manifold to reduce the pressure within the pressure reservoir.

14. A vacuum assist system, as set forth in claim 11, further comprising:
a first check valve operatively disposed between the pressure reservoir and the intake manifold;
wherein the first check valve is configured to allow only the unidirectional flow of air from the pressure reservoir to the intake manifold; and
a second check valve operatively disposed between the pressure reservoir and the venturi valve;
wherein the second check valve is configured to allow only the unidirectional flow of air from the pressure reservoir to the venturi valve.

15. A vacuum assist system, as set forth in claim 14, wherein the first check valve is configured to open and permit the flow of air from the pressure reservoir to the intake manifold when the pressure differential between the pressure reservoir and the intake manifold is sufficiently high.

16. A vacuum assist system, as set forth in claim 15, wherein the second check valve is configured to open and permit the flow of air from the pressure reservoir to the intake manifold when the pressure differential between the pressure reservoir and the venturi valve is sufficiently high.

17. A vacuum assist system, as set forth in claim 16, wherein the first check valve is configured to open and the second check valve is configured to remain closed when the throttle is in the almost-closed position and the proportionally controlled valve is configured to be in the closed position such that air flows from the pressure reservoir to the intake manifold through the first check valve and air is prevented from flowing from the pressure reservoir to the venturi valve through the second check valve; and wherein the first check valve is configured to close and the second check valve is configured to open when the throttle is in the partially open position and the proportionally controlled valve is in the open position such that air flows from the pressure reservoir to the venturi valve through the second check valve and air is prevented from flowing from the pressure reservoir to the intake manifold through the first check valve.

18. A vacuum assist system, as set forth in claim 14, further comprising:
a first line fluidly connecting the intake manifold and the pressure reservoir;
wherein the first check valve is operatively disposed along the first line;
a second line fluidly connecting the pressure reservoir and the venturi valve;
wherein the second check valve is operatively disposed along the second line;
a third line fluidly connecting the venturi valve and the intake manifold;
wherein the proportionally controlled valve is operatively disposed along the third line; and
a bypass line fluidly connecting the intake line and the venturi valve.

* * * * *